United States Patent
Jagota

(10) Patent No.: US 10,110,533 B2
(45) Date of Patent: Oct. 23, 2018

(54) IDENTIFYING ENTITIES IN EMAIL SIGNATURE BLOCKS

(71) Applicant: salesforce.com, inc., San Francisco, CA (US)

(72) Inventor: Arun Jagota, Sunnyvale, CA (US)

(73) Assignee: salesforce.com, inc., San Francisco, CA (US)

( * ) Notice: Subject to any disclaimer, the term of this patent is extended or adjusted under 35 U.S.C. 154(b) by 378 days.

(21) Appl. No.: 14/525,385

(22) Filed: Oct. 28, 2014

(65) Prior Publication Data

US 2016/0117359 A1    Apr. 28, 2016

(51) Int. Cl.
*G06F 17/30* (2006.01)
*H04L 12/58* (2006.01)

(52) U.S. Cl.
CPC ........ *H04L 51/22* (2013.01); *G06F 17/30663* (2013.01); *G06F 17/30684* (2013.01); *H04L 51/28* (2013.01)

(58) Field of Classification Search
CPC ......... G06F 17/30663; G06F 17/30684; H04L 51/28; H04L 51/22
USPC ......................................................... 707/750
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |

(Continued)

OTHER PUBLICATIONS

U.S. Appl. No. 13/998,890.

(Continued)

*Primary Examiner* — Pierre Vital
*Assistant Examiner* — Alicia Antoine
(74) *Attorney, Agent, or Firm* — Dergosits & Noah LLP; Todd A. Noah

(57) ABSTRACT

Identifying entities in email signature blocks is described. A system scores each token, in a sequence of tokens from an email signature block, based on entity types, wherein each token is a word, a punctuation symbol, or an end-of-line character. The system identifies each entity sequence which includes a number of entities that matches the number of tokens in the sequence of tokens. The system identifies an entity sequence with a highest score based on applying scores for each token in the sequence of tokens to each identified entity sequence. The system outputs the sequence of tokens as an identified set of entities based on the entity sequence with the highest score.

20 Claims, 5 Drawing Sheets

(56) References Cited

U.S. PATENT DOCUMENTS

| | | |
|---|---|---|
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,373,985 B1* | 4/2002 | Hu .................. G06K 9/00469 704/9 |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0063415 A1 | 3/2009 | Chatfield et al. |
| 2009/0100342 A1 | 4/2009 | Rueben et al. |
| 2009/0177744 A1 | 7/2009 | Marlow et al. |
| 2010/0174528 A1* | 7/2010 | Oya .................. G06F 17/2735 704/10 |
| 2012/0233137 A1 | 9/2012 | Jakobson et al. |
| 2013/0166489 A1* | 6/2013 | Jagota ............... G06F 17/30985 706/46 |
| 2013/0218948 A1 | 8/2013 | Jakobson |
| 2013/0218949 A1 | 8/2013 | Jakobson |
| 2013/0218966 A1 | 8/2013 | Jakobson |
| 2014/0129569 A1* | 5/2014 | Seeger, III .......... G06Q 10/101 707/748 |
| 2015/0026104 A1* | 1/2015 | Tambos ............ G06F 17/30386 706/12 |
| 2016/0012020 A1* | 1/2016 | George ............... G06F 17/2785 704/9 |

OTHER PUBLICATIONS

U.S. Appl. No. 13/987,075.
U.S. Appl. No. 13/987,074.
U.S. Appl. No. 13/998,065.
U.S. Appl. No. 13/986,744.
U.S. Appl. No. 13/986,251.

* cited by examiner

| Quality | Assurance | Engineer | | | | | | |
|---|---|---|---|---|---|---|---|---|
| title | title | title | | | | | | |
| Sr | . | Systems | Administrator | , | Inter | "-" | networking | |
| title | . | title | title | , | title | "-" | title | |
| www | . | exhaust | . | com | | | | |
| www | . | word | . | domain_suffix | | | | |
| salesforce | . | com | | | | | | |
| word | . | domain_suffix | | | | | | |
| https | : | / | / | www | . | salesforce | . | com |
| http | : | / | / | www | . | Word | . | domain_suffix |
| 0 | . | 639 | . | 235 | . | 9123 | | |
| main_phone | . | 3d | . | 3d | . | 4d | | |
| C | . | 639 | . | 235 | . | 1245 | | |
| cell_phone | . | 3d | . | 3d | . | 4d | | |
| ( | o | ) | : | 639 | . | 235 | . | 4623 |
| ( | main_phone | ) | : | 3d | . | 3d | . | 4d |

IDENTIFYING ENTITIES IN EMAIL SIGNATURE BLOCKS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

An email signature block entity identifier needs to recognize various entities in an email signature block. For example, an email signature block may appear as follows:

John S. Smith, Manager, UX
jsmith@jigsaw.com
T. 650.202.8313|F. 650.202.8314|M. 932.421.3827
www.jigsaw.com|Enterprise|Developer|Community An email signature block entity identifier should recognize that John is a first name, S. is a middle initial, Smith is a last name, Manager, UX is a title, jsmith@jigsaw.com is an email address, 650.202.8313 is a work phone, 650.202.8314 is a fax number, 932.421.3827 is a cell phone, and www.jigsaw.com is a website, making fine distinctions, such as those between the work phone, the cell phone, and the fax number. An email signature block entity identifier needs to be able to do the same for email signature blocks that are formatted differently. Regular expression based pattern matching approaches alone are inadequate for this challenge because an email signature block entity identifier cannot distinguish all of the various entities by regular expression patterns alone. For example, an email signature block entity identifier needs to be able to differentiate between John Smith, Manager and John Smith, Intel. An email signature block entity identifier using regular expression based pattern matching cannot discern that the entity of Manager is a job title and that the entity of Intel is a company name.

BRIEF SUMMARY

In accordance with embodiments, there are provided systems and methods for identifying entities in email signature blocks. Each token, in a sequence of tokens from an email signature block, is scored based on entity types, wherein each token is a word, a punctuation symbol, or an end-of-line character. Each entity sequence is identified which includes a number of entities that matches the number of tokens in the sequence of tokens. An entity sequence with a highest score is identified based on applying scores for each token in the sequence of tokens to each identified entity sequence. The sequence of tokens is output as an identified set of entities based on the entity sequence with the highest score.

For example, a system scores the token "John" from an email signature block with a 0.90 first name entity type, a 0.05 last name entity type, a 0.00 title entity type, and a 0.05 company entity type. The system identifies each entity sequence which includes 5 entities because the sequence of tokens includes the 5 tokens, "John," "Smith," "Chief," "Executive," and "Officer." The system identifies an entity sequence of first name-last name-title-title-title as the entity sequence with the highest score based on multiplying scores for each token in the sequence of tokens for each entity sequence that includes 5 entities. The system outputs "John" as the first name, "Smith" as the last name, and "Chief Executive Officer" as the title based on the entity sequence of first name-last name-title-title-title having the highest score.

While one or more implementations and techniques are described with reference to an embodiment in which identifying entities in email signature blocks is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for identifying entities in email signature blocks. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. Next, mechanisms and methods for identifying entities in email signature blocks will be described with reference to example embodiments. The following detailed description will first describe a method for identifying entities in email signature blocks. Next, tables of example entity sequences for identifying entities in email signature blocks are described.

Figure 1:
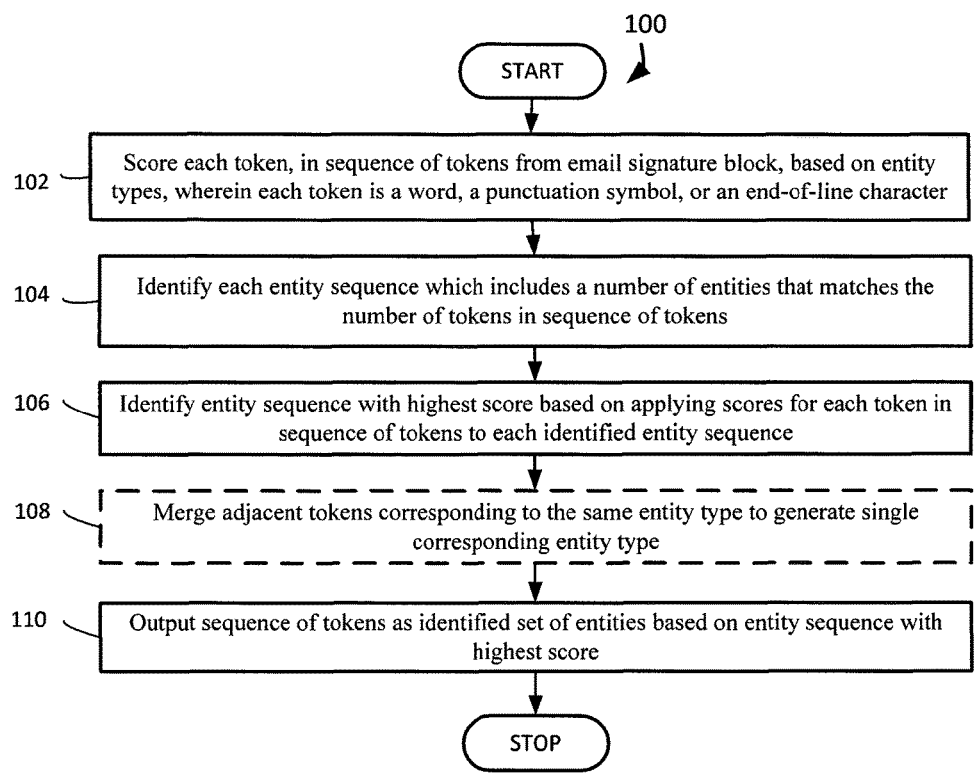
FIG. 1 is an operational flow diagram illustrating a high level overview of a method for identifying entities in email signature blocks, in an embodiment.

FIG. 1 is an operational flow diagram illustrating a high level overview of a method 100 for identifying entities in email signature blocks. As shown in FIG. 1, a database system may identify entities in email signature blocks.

A database system scores each token, in a sequence of tokens from an email signature block, based on entity types, wherein each token is a word, a punctuation symbol, or an end-of-line character, block 102. For example and without limitation, this can include the database system scoring the token "John" from an email signature block with a 0.90 first name entity type, a 0.05 last name entity type, a 0.00 title entity type, and a 0.05 company entity type. An entity recognition training set may be a collection of (entity value, entity name, weight) triples. For example, (John, first_name, 150) teaches the database system that John is a person's first name with a weight 150. The weight captures the strength of the association between the entity value and the entity name. A weight is useful in ambiguous cases, such as when an entity value is associated with multiple entity names. For example, Lee might be a person's first name or a person's last name. The weight may be set to the frequency of the occurrence of the entity value as the particular entity name, such as John as a first name in a database. Recognition of the various entities that might appear in email signature blocks may require a large and diverse training set of person first and last names, of job titles, of company names, and more. Such a training set may be readily available from a contacts database, such as the Jigsaw® database.

The database system may input a string, such as Chief Executive Officer, and output the likely name of the string, in this example job title. In the word-level k-gram, $k \geq 1$ features may be used. Additionally, some position-specific features, such as last word in string, may also be used. The resulting entity recognizer may be very accurate; however it may consume a large amount of memory. Therefore, the database system may use character-level k-gram features (plus character-level unigram, bigram, . . . , (k−1)-gram features for the first character, the first two characters, . . . , the first k−1 characters of the string). Using character-level k-gram features produces a much more compact model.

$X = x_1, \ldots, x_n$ denotes an n-character string to be classified, and c denotes a class. The likelihood $P(X|c)$ is defined under the character-level k-grams model to be:
when $n > k$ $$P(X|c) = P(x_1|c) * P(x_2|x_1,c) * P(x_3|x_1,x_2,c)* \ldots *P(x_j|x_{j-k+1}, x_{j-k+2}, \ldots, x_{j-1}, c)* \ldots \quad \text{Equation (1)}$$

when $n \leq k$ $$P(X|c) = P_{c,k}(X) \quad \text{Equation (2)}$$

In equation (2), the sample space of $P_{c,k}$ is the set of all k-character strings. $P_{c,k}$ is a probability distribution over this set for the class c. The probability distributions in equations (1) and (2) are estimated from a training set of strings in the class c in the obvious (maximum likelihood, i.e. relative frequency based) way. Equation (1) is arrived at by making the (k−1)th-order Markovian assumption for large strings. For short strings ($n \leq k$) the assumption is that enough data is present to estimate an assumption-free, and therefore more accurate, model, which is equation (2).

An ad-hoc posteriors distribution is formulated, over the classes, from the likelihoods $P(X|c)$. This is done mainly to blend in probabilistic classification, with dictionary-based classification, with regular expression based classification, and with identity-based classification. Identity-based classification works off a training set I of identity strings. If X is one of these strings, then the entity of X is itself. Identity-based classification is especially useful for handling punctuation symbols as entities so they can be captured in entity sequences. The pseudo-code description of the way the augmented classifier, such as one that blends in probabilistic classification with regular expression based classification, and with identity-based classification, is:

if X appears in I
   return $P(X) = 1$
else if X appears in a dictionary for an entity e
   return $P(e) = 1$
else if X matches to a regular expression for entity e
   returnP(e) = 1
else
   compute and return $P(c|X) = \dfrac{P(X|c)}{\sum\limits_{c'} P(X|c')}$ The model may be on four classes: first name, last name, title, and company name. The training set for each class may be chosen to be the multiset of all the strings in each class, obtained from a contacts database. Multiset means that a string is repeated in a training set with the same frequency with which the string occurred in a contacts database. For example, if the string "John" occurred 1 million times in a contacts database as a person's first name, the string "John" is repeated 1 million times in the training set for the class first name.

Figure 2A:
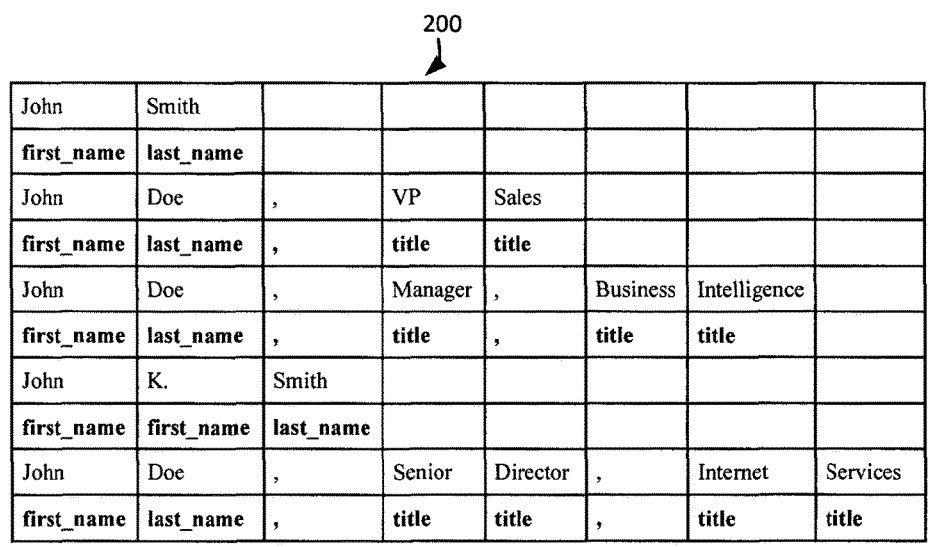
FIG. 2A and FIG. 2B are tables of example entity sequences in the sequence modeling training set for identifying entities in email signature blocks, in an embodiment.
Figure 2B:

Having scored the tokens in the email signature block, the database system identifies each entity sequence which includes a number of entities that matches the number of tokens in the sequence of tokens, block 104. By way of example and without limitation, this can include the database system identifying each entity sequence which includes 5 entities because the sequence of tokens includes the 5 tokens, "John," "Smith," "Chief," "Executive," and "Officer." Tables of example entity sequences for identifying entities in email signature blocks are depicted in FIG. 2A and FIG. 2B, and described below in the description of FIG. 2A and FIG. 2B. After the database system scores each token (word, punctuation symbol, end-of-line character) individually for the likely entity names that each token could be, the database system finds a high-scoring parse from this score matrix. Let $T = (t_1, \ldots, t_n)$ denote the sequence of tokens in the email signature block. The entity recognizer is run on each token in this sequence. This yields a score matrix $S = (s_{ij})$, where $s_{ij}$ is the score that token $t_i$ is the entity name j. An example of a score matrix is depicted and discussed below in reference to block 106.

A parse of a token sequence $T = (t_1, \ldots, t_n)$ is an entity sequence $E = (e_1, \ldots, e_n)$, where $e_i$ is the entity of $t_i$. A high-scoring parse is one which has a high score. The scoring needs to consider both the entity recognition scores and the sequence modeling scores. In contrast to entity recognition, sequence modeling for the purpose of email signature block parsing may need a much smaller training set. Such a training set only needs to capture the sequence (pattern) of entity names inter-mixed with linguistic signals, such as punctuation symbols, that are commonly seen in email signature blocks. A training set containing about 100 well-chosen patterns may be adequate. Such a training set may need to be constructed manually, so it is fortunate that a small-size training set is adequate.

The sequence modeling training set is a set $\{(e, w_e)\}$, where e is an entity sequence and $w_e$ its weight. Entity sequences that occur more frequently in actual email signature blocks tend to get higher weights. An entity sequence in this training set may be required to span the entire email signature block. Some generalization on top of this may be obtained at inference time, specifically by requiring the token sequence to match only a prefix of an entity sequence in the training set instead of being required to match an entire entity sequence in the training set. This approach may have very high precision. However, high recall may be achievable at the cost of laboriously adding new entity sequences to the sequence modeling training set, even when the entity sequence of a new email signature block is only very slightly different from one in the training set. Therefore, the sequence modeler may be trained on the sequence of entities found in any one line in an email signature block. The training on the basis of entities found in any one line may yield substantially higher recall than the entire entity sequence approach when training sets of comparable sizes are used. On the other hand, the new approach risks lowering the precision. This risk may be mitigated as follows. One more attribute may be added to each example in the training set. That is, a training example is now a triple $(e, w_e, a)$, where a is true if e was derived from the first line of an email signature block and false if not. Also, the high-scoring parse found on a line may be constrained to exclude any entities that have been found in parses of earlier lines.

Adding an attribute may be done because the first line of an email signature block has a strong bias towards particular entities. For example, a person's name appears the vast majority of the time on the first line. Moreover, there is no previous line that constrains the likely entities on this first line further. Model line-specific effects are intentionally not modeled for other lines in an email signature block because there is a lot more variability on which entities occur in which lines on lines other than the first line. For example, an email address may appear on the second line of an email signature block, the third line, or may be entirely absent.

In view of this insight about other lines, not only is it merely unnecessary to model line-specific effects, in fact it may be better to not do so. This lack of modeling other line-specific effects may afford more generalization, such as higher recall. On lines other than the first one, constraining to exclude any entities that have been found in parses of earlier lines may mitigate the risk of low precision. Specifically, when parsing a line other than the first one, entities found in earlier lines may be excluded from consideration.

The training algorithm automatically may learn a different model for the entity sequences in the first line of an email signature block than that for the rest of the lines. Therefore, the algorithm may be applicable not just for parsing email signature blocks, but also for parsing any text containing one or a few lines in which there is embedded structure. All the database system may need is a sequence modeling training set for such structures. For example, the training algorithm may require no change to parse entities embedded in quoted text such as: "This is an area you traditionally would not think of us as being in," said Phil McKinney, chief technology officer in HP's Personal Systems Group . . . ." The database system extracts out Phil as the person's first name, McKinney as the person's last name, chief technology officer as the person's job title, and HP as the company. The sequence in which the entities appear in quoted text can differ. For example: "This is the part of the Windows Vista backlash that really matters," said IDC analyst Richard Shim, who had recently seen HP's Linux mini-laptop." In view of this, parsing of such structures, as for email signature block parsing, is an ideal use case for the algorithm.

After identifying entity sequences that may match the sequence of tokens, the database system identifies the entity sequence with the highest score based on applying scores for each token in the sequence of tokens to each identified entity sequence, block 106. In embodiments, this can include the database system identifying an entity sequence of first name-last name-title-title-title as the entity sequence with the highest score based on multiplying scores for each token in the sequence of tokens for each entity sequence that includes 5 entities. An algorithm may find a high-scoring parse for the given token sequence $T=(t_1, \ldots, t_n)$, from its entities score matrix S, and from the sequence modeling training set. Block 104 involved finding the subset $E_n$ of entity sequences in the training set of length n, which may be done very quickly by indexing the entity sequences in the training set with their length. Block 106 finds the entity sequence e in $E_n$ which scores the highest. The score of an entity sequence e may be defined to be $$S(e) = w_e \sum_{i=1}^{n} \log P(e_i \mid t_i)$$

$\sum_{i=1}^{n} \log P(e_i|t_i)$ is the log-probability of e from entity recognition signals alone, such as from the entities score matrix, under the assumption of independence of the entity recognition events across the tokens. $w_e$ multiplies this term by the weight of the entity sequence e in the sequence modeling training set.

The example score matrix depicted below is for the email signature block token sequence "John Smith Chief Executive Officer," and will be used as the basis for calculating example scores for corresponding entity sequences. Although the example score matrix depicts rows only for first name, last name, title, and company name, a score matrix may include rows for other entities as well, such as email address, website, work phone, cell phone, and fax number. Using this example score matrix, the database system calculates example entity sequence scores for two entity sequences, for first name-last name-title-title-title and for first name-last name-company name-company name-company name. However, the database system may calculate entity sequence scores for as many entity sequences which include the same number of entities as the number of tokens in the sequence of tokens, such as for first name-middle initial-last name-title-company name.

|  | John | Smith | Chief | Executive | Officer |
|---|---|---|---|---|---|
| first name | 0.90 | 0.05 | 0.10 | 0.00 | 0.00 |
| last name | 0.05 | 0.70 | 0.00 | 0.05 | 0.05 |
| title | 0.00 | 0.05 | 0.70 | 0.75 | 0.70 |
| company name | 0.05 | 0.20 | 0.20 | 0.20 | 0.25 |

Since the entity recognition step returned non-zero scores for the last three tokens based on both title and for company name, the database system calculates the score for both the title-based entity sequence and the company name-based entity sequence to determine which entity sequence results in the highest score for the 5 tokens in the token sequence, which may be from the first line of an email signature block. For the entity sequence first name-last name-title-title-title, the database system multiplies the score of 0.90 for the first name by the score of 0.70 for the last name by the score of 0.70 for the first title entity by the score of 0.75 for the second title entity by the score of 0.70 for the third title entity to produce the score of 0.23 for the title-based entity sequence. Then for the entity sequence first name-last name-company name-company name-company name, the database system multiplies the score of 0.90 for the first name by the score of 0.70 for the last name by the score of 0.20 for the first company name entity by the score of 0.20 for the second company name entity by the score of 0.25 for the third company name entity to produce the score of 0.01 for the company name-based entity sequence. Based on these calculations of 0.23 and 0.01, the database system identifies the 5 token sequence of "John Smith Chief Executive Officer" as corresponding to the entity sequence first name-last name-title-title-title. Although in this example the database system multiplied the scores for the individual tokens together to calculate the score for the entity sequences, the database system may calculate the scores for the entity sequences differently.

After identifying the entity sequence that matches the sequence of tokens, the database system optionally merges adjacent tokens corresponding to the same entity type to generate a single corresponding entity type, block 108. For example and without limitation, this can include the database system merging "Chief," "Executive," and "Officer," each of which corresponds to the title entity type, to generate "Chief Executive Officer" as a title entity type. The tokens corresponding to the identified entity sequence may need further post-processing. Minimally, the entities of adjacent words may need to be merged. The post-processing algorithm may use a combination of rules and logic. Each rule may have has the form (e, c, i, j, o) where e is the entity sequence being post-processed and c the transformed entity extractable by joining the ith through the jth tokens in the token sequence. The join character is o. For example,
e=[main_phone_qualifier, (, 3d,), 3d, 4d]
c=phone
i=1, j=5, o=""

A rule may extract out the phone number in a string recognized to be a phone, but with a qualifier in front of it. For example, the database system tokens the string "T (903) 834 2345" to ["T","(","903",")","834","2345"]. The database system identifies the string:

| T as main_phone_qualifier | (903) (3d) | 834 3d | 2345 4d |
|---|---|---|---|

Here main_phone_qualifier is an entity recognized, via a dictionary lookup, for strings such as T, phone, etc., that essentially state that a phone follows. The parentheses "(" and ")" are identity entities, and 3d and 4d are entities denoting a string of 3 digits and 4 digits, respectively, and are recognized by regular expressions. Treating even phone recognition as entity recognition plus sequence modeling has the benefit that a wide variety of formats in which phones are expressed, can be easily expressed in training set items that mirror these formats, and associated post-processing rules. This is especially attractive when a string may contain the actual phone number and some additional text, as in the example. The above-described rule when applied to

| T main_phone_qualifier | (903) (3d) | 834 3d | 2345 4d |
|---|---|---|---| produces (903) 834 2345 phone. The rule set may contain multiple rules with the same value of e. This is because, for certain entity sequences, multiple composite entities may be extractable from the entity sequence. An example of one such entity sequence is: [main_phone_qualifier, (, 3d,), 3d, 4d,word,@,word,.,domain_suffix].

An example of a string for which this entity sequence is the best parse is "T (903) 834 2345 john@ibm.com." To facilitate this, the database system tokenizes this string as ["T","(","903",")","834","2345","john","@","ibm",".","com"] This string contains both a phone and an email. The database system may use two rules to extract the two entities. The database system may complement rules with some simple logic to concisely cover many cases which would individually require different rules. This logic may be "if e contains a maximal subsequence of contiguous entities which are all the same or commas, then merge the token sequence corresponding to this subsequence into a single entity of the same name." This logic is especially useful for merging title and company name entities. For example:

| John | Smith | Chief | Executive | Officer |
|---|---|---|---|---|
| first_name | last_name | title | title | title |

The above-described logic merges the three title tokens into one title token. That is, the logic produces the transformed results:

| John | Smith | Chief Executive Officer |
|---|---|---|
| first_name | last_name | title. |

In another example:

| Cisco | Systems |
|---|---|
| company | company |

This logic merges the two company tokens into one company token. That is, the logic produces
Cisco Systems
Company Having identified the entity sequence that matches the sequence of tokens, the database system outputs the sequence of tokens as an identified set of entities based on the entity sequence with the highest score, block 110. By way of example and without limitation, this can include the database system outputting "John" as the first name, "Smith" as the last name, and "Chief Executive Officer" as the title based on the entity sequence of first name-last name-title-title-title having the highest score.

The method 100 may be repeated as desired. Although this disclosure describes the blocks 102-110 executing in a particular order, the blocks 102-110 may be executed in a different order. In other implementations, each of the blocks 102-110 may also be executed in combination with other blocks and/or some blocks may be divided into a different set of blocks.

FIG. 2A and FIG. 2B illustrate tables of example entity sequences for identifying entities in email signature blocks, under an embodiment. FIG. 2A depicts a table 200, which includes example entity sequences depicted in bold font, with the row preceding each entity sequence containing an example of a token sequence that matches the entity sequence. The table 200 includes examples of entity sequences that may appear in the first line of email signature blocks. The table 200 does not depict the corresponding weights for each entity.

FIG. 2B depicts a table 202, which includes example entity sequences depicted in bold font, with the row preceding each entity sequence containing an example of a token sequence that matches the entity sequence. The table 202 includes examples of entity sequences that may appear in the second, third, or later lines of email signature blocks. The table 202 does not depict the corresponding weights for each entity.

The table below depicts the results of some post-processing rules. In each row of the table below, the first three columns are the triple (c, i, j) as defined above in reference to post-processing rules. The columns to the right of the first three columns form the entity sequence e. The join string o in all three cases is " ", the empty string.

| phone | 2 | 6 | + | 1 | . | 3d | . | | 3d | . | 4d |
|---|---|---|---|---|---|---|---|---|---|---|---|
| website | 0 | 2 | www | . | word | . | domain_suffix | | | | |
| email | 0 | 6 | Word | @ | word | . | domain_suffix | | | | |

System Overview

Figure 3:
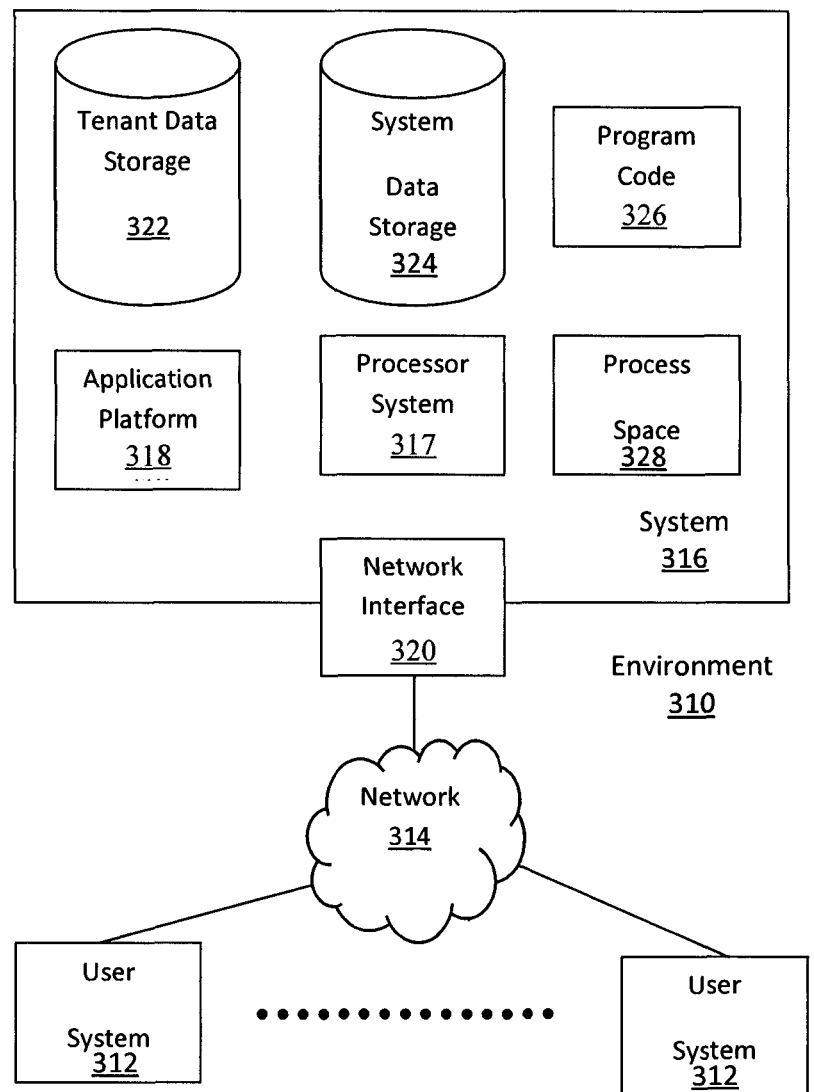
FIG. 3 illustrates a block diagram of an example of an environment wherein an on-demand database service might be used.

FIG. 3 illustrates a block diagram of an environment 310 wherein an on-demand database service might be used. The environment 310 may include user systems 312, a network 314, a system 316, a processor system 317, an application platform 318, a network interface 320, a tenant data storage 322, a system data storage 324, program code 326, and a process space 328. In other embodiments, the environment 310 may not have all of the components listed and/or may have other elements instead of, or in addition to, those listed above.

The environment 310 is an environment in which an on-demand database service exists. A user system 312 may be any machine or system that is used by a user to access a database user system. For example, any of the user systems 312 may be a handheld computing device, a mobile phone, a laptop computer, a work station, and/or a network of computing devices. As illustrated in FIG. 3 (and in more detail in FIG. 4) the user systems 312 might interact via the network 314 with an on-demand database service, which is the system 316.

An on-demand database service, such as the system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 316" and the "system 316" will be used interchangeably herein. A database image may include one or more database objects. A relational database management system (RDMS) or the equivalent may execute storage and retrieval of information against the database object(s). The application platform 318 may be a framework that allows the applications of the system 316 to run, such as the hardware and/or software, e.g., the operating system. In an embodiment, the on-demand database service 316 may include the application platform 318 which enables creation, managing and executing one or more applications developed by the provider of the on-demand database service, users accessing the on-demand database service via user systems 312, or third party application developers accessing the on-demand database service via the user systems 312.

The users of the user systems 312 may differ in their respective capacities, and the capacity of a particular user system 312 might be entirely determined by permissions (permission levels) for the current user. For example, where a salesperson is using a particular user system 312 to interact with the system 316, that user system 312 has the capacities allotted to that salesperson. However, while an administrator is using that user system 312 to interact with the system 316, that user system 312 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 314 is any network or combination of networks of devices that communicate with one another. For example, the network 314 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 312 might communicate with the system 316 using TCP/IP and, at a higher network level, use other common Internet protocols to communicate, such as HTTP, FTP, AFS, WAP, etc. In an example where HTTP is used, the user systems 312 might include an HTTP client commonly referred to as a "browser" for sending and receiving HTTP messages to and from an HTTP server at the system 316. Such an HTTP server might be implemented as the sole network interface between the system 316 and the network 314, but other techniques might be used as well or instead. In some implementations, the interface between the system 316 and the network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 316, shown in FIG. 3, implements a web-based customer relationship management (CRM) system. For example, in one embodiment, the system 316 includes application servers configured to implement and execute CRM software applications as well as provide related data, code, forms, webpages and other information to and from the user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 316 implements applications other than, or in addition to, a CRM application. For example, the system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of the system 316 is shown in FIG. 3, including the network interface 320, the application platform 318, the tenant data storage 322 for tenant data 323, the system data storage 324 for system data 325 accessible to the system 316 and possibly multiple tenants, the program code 326 for implementing various functions of the system 316, and the process space 328 for executing MTS system processes and tenant-specific processes, such as running applications as part of an application hosting service. Additional processes that may execute on the system 316 include database indexing processes.

Several elements in the system shown in FIG. 3 include conventional, well-known elements that are explained only briefly here. For example, each of the user systems 312 could include a desktop personal computer, workstation, laptop, PDA, cell phone, or any wireless access protocol (WAP) enabled device or any other computing device capable of interfacing directly or indirectly to the Internet or other network connection. Each of the user systems 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 312 to access, process and view information, pages and applications available to it from the system 316 over the network 314. Each of the user systems 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 316 or other systems or servers. For example, the user interface device may be used to access data and applications hosted by the system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 312 and all of its components are operator configurable using applications, such as a browser, including computer code run using a central processing unit such as an Intel Pentium® processor or the like. Similarly, the system 316 (and additional instances of an MTS, where more than one is present) and all of their components might be operator configurable using application(s) including computer code to run using a central processing unit such as the processor system 317, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring the system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 316 is configured to provide webpages, forms, applications, data and media content to the user (client) systems 312 to support the access by the user systems 312 as tenants of the system 316. As such, the system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4:
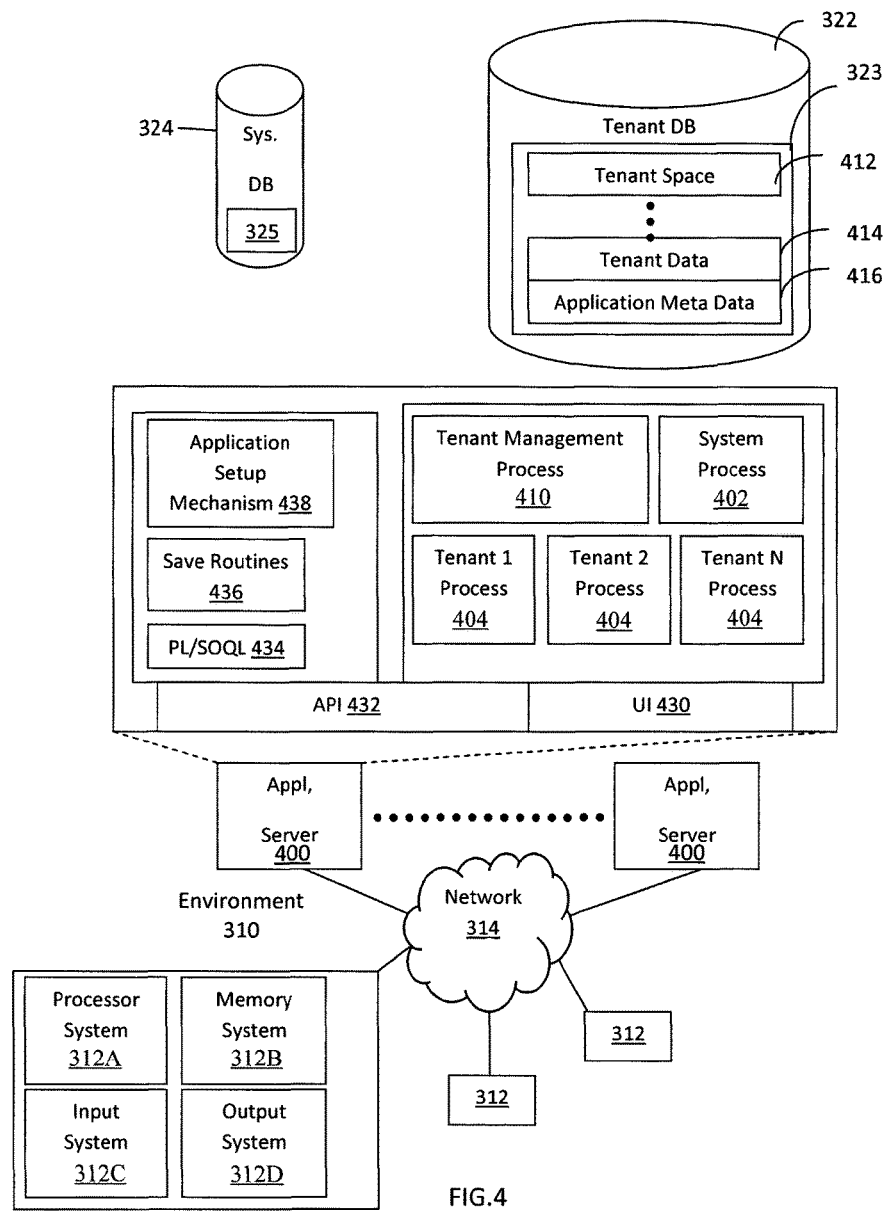
FIG. 4 illustrates a block diagram of an embodiment of elements of FIG. 3 and various possible interconnections between these elements.

FIG. 4 also illustrates the environment 310. However, in FIG. 4 elements of the system 316 and various interconnections in an embodiment are further illustrated. FIG. 4 shows that the each of the user systems 312 may include a processor system 312A, a memory system 312B, an input system 312C, and an output system 312D. FIG. 4 shows the network 314 and the system 316. FIG. 4 also shows that the system 316 may include the tenant data storage 322, the tenant data 323, the system data storage 324, the system data 325, a User Interface (UI) 430, an Application Program Interface (API) 432, a PL/SOQL 434, save routines 436, an application setup mechanism 438, applications servers 4001-400N, a system process space 402, tenant process spaces 404, a tenant management process space 410, a tenant storage area 412, a user storage 414, and application metadata 416. In other embodiments, the environment 310 may not have the same elements as those listed above and/or may have other elements instead of, or in addition to, those listed above.

The user systems 312, the network 314, the system 316, the tenant data storage 322, and the system data storage 324 were discussed above in FIG. 3. Regarding the user systems 312, the processor system 312A may be any combination of one or more processors. The memory system 312B may be any combination of one or more memory devices, short term, and/or long term memory. The input system 312C may be any combination of input devices, such as one or more keyboards, mice, trackballs, scanners, cameras, and/or interfaces to networks. The output system 312D may be any combination of output devices, such as one or more monitors, printers, and/or interfaces to networks. As shown by FIG. 4, the system 316 may include the network interface 320 (of FIG. 3) implemented as a set of HTTP application servers 400, the application platform 318, the tenant data storage 322, and the system data storage 324. Also shown is the system process space 402, including individual tenant process spaces 404 and the tenant management process space 410. Each application server 400 may be configured to access tenant data storage 322 and the tenant data 323 therein, and the system data storage 324 and the system data 325 therein to serve requests of the user systems 312. The tenant data 323 might be divided into individual tenant storage areas 412, which can be either a physical arrangement and/or a logical arrangement of data. Within each tenant storage area 412, the user storage 414 and the application metadata 416 might be similarly allocated for each user. For example, a copy of a user's most recently used (MRU) items might be stored to the user storage 414. Similarly, a copy of MRU items for an entire organization that is a tenant might be stored to the tenant storage area 412. The UI 430 provides a user interface and the API 432 provides an application programmer interface to the system 316 resident processes to users and/or developers at the user systems 312. The tenant data and the system data may be stored in various databases, such as one or more Oracle™ databases.

The application platform 318 includes the application setup mechanism 438 that supports application developers' creation and management of applications, which may be saved as metadata into the tenant data storage 322 by the save routines 436 for execution by subscribers as one or more tenant process spaces 404 managed by the tenant management process 410 for example. Invocations to such applications may be coded using the PL/SOQL 434 that provides a programming language style interface extension to the API 432. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 416 for the subscriber making the invocation and executing the metadata as an application in a virtual machine.

Each application server 400 may be communicably coupled to database systems, e.g., having access to the system data 325 and the tenant data 323, via a different network connection. For example, one application server 4001 might be coupled via the network 314 (e.g., the Internet), another application server 400N-1 might be coupled via a direct network link, and another application server 400N might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, the system 316 is multi-tenant, wherein the system 316 handles storage of, and access to, different objects, data and applications across disparate users and organizations.

As an example of storage, one tenant might be a company that employs a sales force where each salesperson uses the system 316 to manage their sales process. Thus, a user might maintain contact data, leads data, customer follow-up data, performance data, goals and progress data, etc., all applicable to that user's personal sales process (e.g., in the tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 316 might also maintain system level data usable by multiple tenants or other data. Such system level data might include industry reports, news, postings, and the like that are sharable among tenants.

In certain embodiments, the user systems 312 (which may be client systems) communicate with the application servers 400 to request and update system-level and tenant-level data from the system 316 that may require sending one or more queries to the tenant data storage 322 and/or the system data storage 324. The system 316 (e.g., an application server 400 in the system 316) automatically generates one or more SQL statements (e.g., one or more SQL queries) that are designed to access the desired information. The system data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system for identifying entities in email signature blocks, the apparatus comprising:
one or more processors; and
a non-transitory computer readable medium storing a plurality of instructions, which when executed, cause the one or more processors to:
create a plurality of scores for each token, in a sequence of tokens from an email signature block, based on a corresponding independent probability distribution that has been previously trained for a plurality of entity types, wherein each token comprises one of a word, a punctuation symbol, and an end-of-line character, an entity being a part of one of a person name, a job title, an enterprise name, a telephone number, an email address, and a uniform resource locator, and being associated with at least one of an entity type, an entity sequence, and a set of entities;
identify each entity sequence that has a total number of entities that is identical to a total number of tokens in the sequence of tokens;
determine, for each of the identified entity sequences, an entity sequence score by combining corresponding scores for each token in the sequence of tokens, that corresponds to an entity type in an identified entity sequence;
identify an entity sequence from the identified entity sequences with a highest entity sequence score; and
output the sequence of tokens as an identified set of entities, in the email signature block, based on the entity sequence with the highest score.

2. The system of claim 1, wherein scoring each token in the sequence of tokens from the email signature block based on the plurality of entity types comprises scoring each token based on a k-gram from a token matching at least one of the plurality of entity types, wherein the k-gram from the token comprises a string of consecutive characters in the token, with k as a length of the string of consecutive characters in the token.

3. The system of claim 1, wherein the sequence of tokens from the email signature block comprises a sequence of tokens from a same line of the email signature block.

4. The system of claim 1, wherein identifying each entity sequence in the plurality of entity sequences which comprises the number of entities that matches the number of tokens in the sequence of tokens comprises identifying each entity sequence which corresponds to an initial line of the email signature block.

5. The system of claim 1, wherein identifying each entity sequence in the plurality of entity sequences which comprises the number of entities that matches the number of tokens in the sequence of tokens comprises identifying each entity sequence which excludes entities identified from a previous line of the email signature block.

6. The system of claim 1, wherein combining corresponding scores for each token, in the sequence of tokens, that corresponds to an entity type in an identified entity sequence comprises multiplying scores for each token, in the sequence of tokens, that corresponds to each entity type, for each identified entity sequence.

7. The system of claim 1, comprising further instructions, which when executed, cause the one or more processors to merge adjacent tokens corresponding to a same entity type to generate a single corresponding entity type.

8. A computer program product comprising computer-readable program code to be executed by one or more processors when retrieved from a non-transitory computer-readable medium, the program code including instructions to:
   create a plurality of scores for each token, in a sequence of tokens from an email signature block, based on a corresponding independent probability distribution that has been previously trained for a plurality of entity types, wherein each token comprises one of a word, a punctuation symbol, and an end-of-line character, an entity being a part of one of a person name, a job title, an enterprise name, a telephone number, an email address, and a uniform resource locator, and being associated with at least one of an entity type, an entity sequence, and a set of entities;
   identify each entity sequence that has a total number of entities that is identical to a total number of tokens in the sequence of tokens;
   determine, for each of the identified entity sequences, an entity sequence score by combining corresponding scores for each token, in the sequence of tokens, that corresponds to an entity type in an identified entity sequence;
   identify an entity sequence from the identified entity sequences with a highest entity sequence score; and
   output the sequence of tokens as an identified set of entities, in the email signature block, based on the entity sequence with the highest score.

9. The computer program product of claim 8, wherein scoring each token in the sequence of tokens from the email signature block based on the plurality of entity types comprises scoring each token based on a k-gram from a token matching at least one of the plurality of entity types, wherein the k-gram from the token comprises a string of consecutive characters in the token, with k as a length of the string of consecutive characters in the token.

10. The computer program product of claim 8, wherein the sequence of tokens from the email signature block comprises a sequence of tokens from a same line of the email signature block.

11. The computer program product of claim 8, wherein identifying each entity sequence in the plurality of entity sequences which comprises the number of entities that matches the number of tokens in the sequence of tokens comprises identifying each entity sequence which corresponds to an initial line of the email signature block.

12. The computer program product of claim 8, wherein identifying each entity sequence in the plurality of entity sequences which comprises the number of entities that matches the number of tokens in the sequence of tokens comprises identifying each entity sequence which excludes entities identified from a previous line of the email signature block.

13. The computer program product of claim 8, wherein combining corresponding scores for each token, in the sequence of tokens, that corresponds to an entity type in an to identified entity sequence comprises multiplying scores for each token, in the sequence of tokens, that corresponds to each entity type, for each identified entity sequence.

14. The computer program product of claim 8, wherein the program code comprises further instructions to merge adjacent tokens corresponding to a same entity type to generate a single corresponding entity type.

15. A method for identifying entities in email signature blocks, the method comprising:
   creating a plurality of scores for each token, in a sequence of tokens from an email signature block, based on a corresponding independent probability distribution that has been previously trained for a plurality of entity types, wherein each token comprises one of a word, a punctuation symbol, and an end-of-line character, an entity being a part of one of a person name, a job title, an enterprise name, a telephone number, an email address, and a uniform resource locator, and being associated with at least one of an entity type, an entity sequence, and a set of entities;
   identifying each entity sequence that has a total number of entities that is identical to a total number of tokens in the sequence of tokens;
   determining, for each of the identified entity sequences, an entity sequence score by combining corresponding scores for each token, in the sequence of tokens, that corresponds to an entity type in an identified entity sequence;
   identifying an entity sequence from the identified entity sequences with a highest entity sequence score; and
   outputting the sequence of tokens as an identified set of entities, in the email signature block, based on the entity sequence with the highest score.

16. The method of claim 15, wherein scoring each token in the sequence of tokens from the email signature block based on the plurality of entity types comprises scoring each token based on a k-gram from a token matching at least one of the plurality of entity types, wherein the k-gram from the token comprises a string of consecutive characters in the token, with k as a length of the string of consecutive characters in the token.

17. The method of claim 15, wherein the sequence of tokens from the email signature block comprises a sequence of tokens from a same line of the email signature block.

18. The method of claim 15, wherein identifying each entity sequence in the plurality of entity sequences which comprises the number of entities that matches the number of tokens in the sequence of tokens comprises at least one of identifying each entity sequence which corresponds to an initial line of the email signature block and identifying each entity sequence which excludes entities identified from a previous line of the email signature block.

19. The method of claim 15, wherein combining corresponding scores for each token, in the sequence of tokens, that corresponds to an entity type in an to identified entity sequence comprises multiplying scores for each token, in the sequence of tokens, that corresponds to each entity type, for each identified entity sequence.

20. The method of claim 15, the method further comprising merging adjacent tokens corresponding to a same entity type to generate a single corresponding entity type.

* * * * *